United States Patent [19]

Bixler et al.

[11] Patent Number: 4,813,375

[45] Date of Patent: Mar. 21, 1989

[54] BRAND VAC

[76] Inventors: Dickie R. Bixler; Alicia B. Bixler, both of Rt. 1, Box 33, Dacoma, Okla. 73731

[21] Appl. No.: 125,480

[22] Filed: Nov. 25, 1987

[51] Int. Cl.⁴ .............................................. A01K 11/00
[52] U.S. Cl. ......................................... 119/1; 219/228
[58] Field of Search ........... 219/228, 229, 230, 137.41; 119/1

[56] References Cited

U.S. PATENT DOCUMENTS 3,515,096  6/1970  Hogg ........................................ 119/1
4,358,662  11/1982  Cranor et al. ........................ 219/230

Primary Examiner—Robert Peshock
Attorney, Agent, or Firm—Head & Johnson

[57] ABSTRACT

A branding iron, especially for cattle, is provided with a vacuum pump having a vacuum hose with its open end in the vicinity of the hot iron to remove smoke and pollutants.

5 Claims, 2 Drawing Sheets

U.S. Patent  Mar. 21, 1989  Sheet 1 of 2  4,813,375
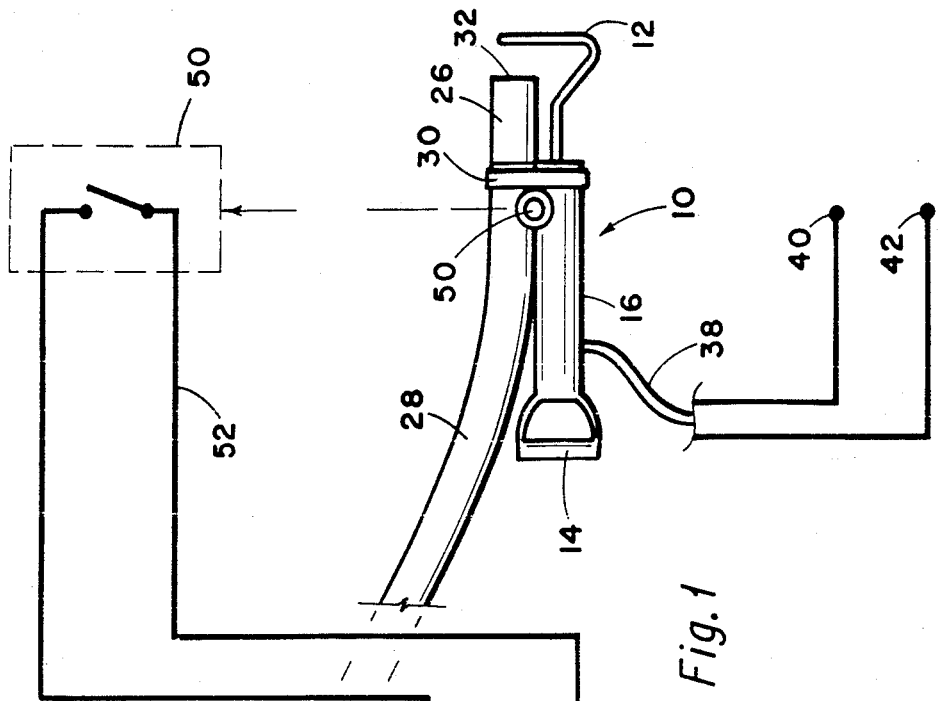
Fig.1
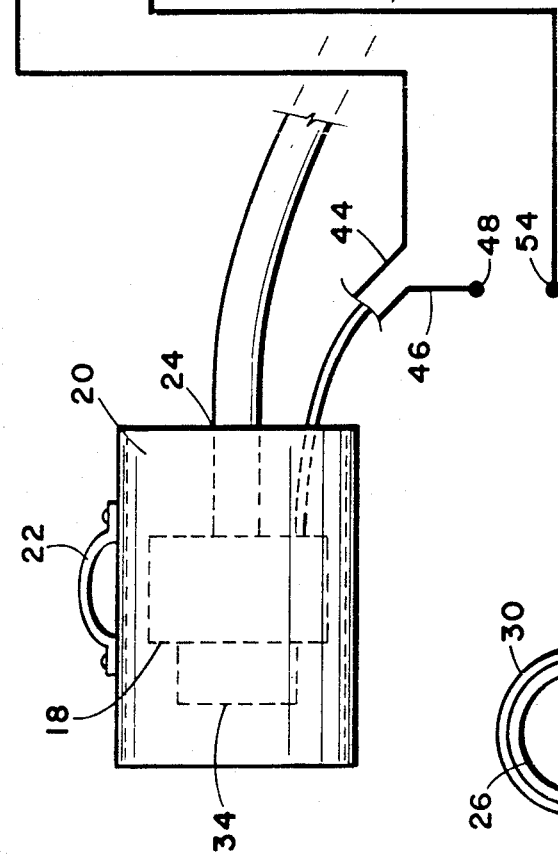
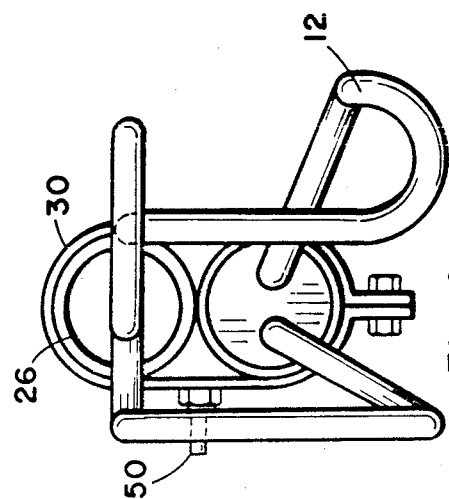
Fig.4

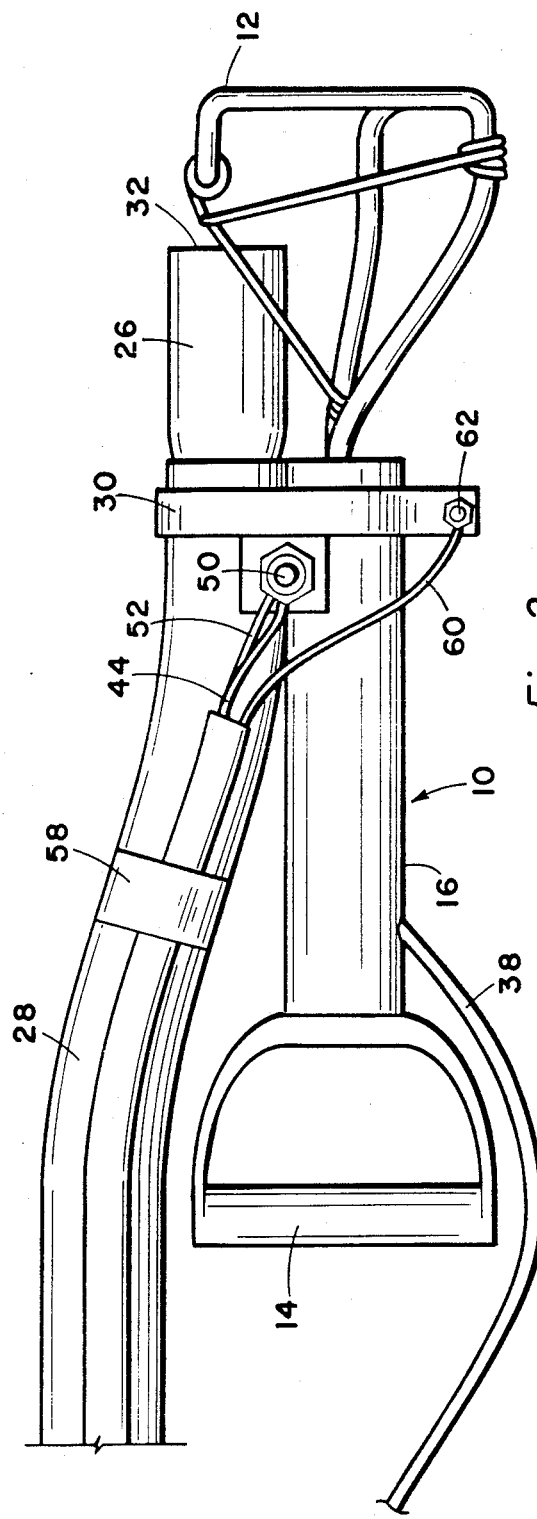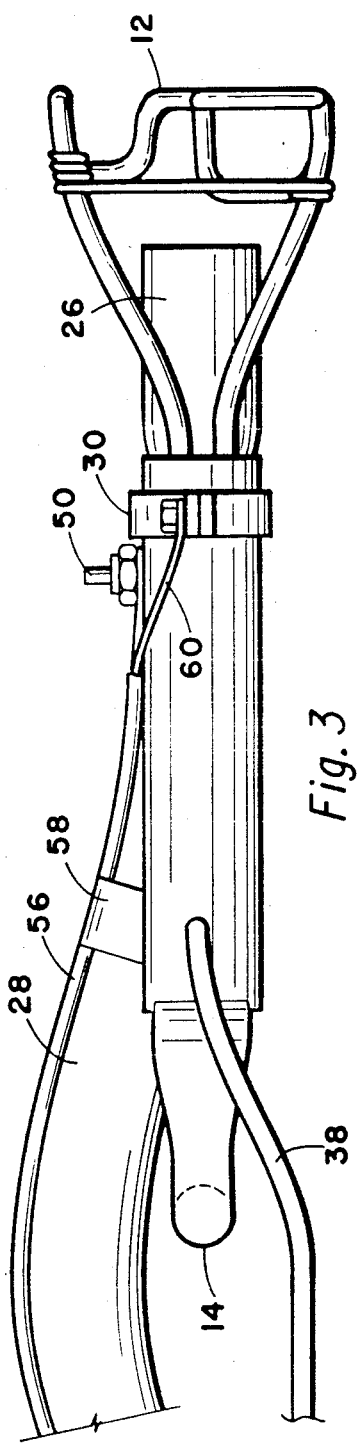

BRAND VAC

DISCLOSURE STATEMENT

A preliminary patentability search conducted by a commercial searcher revealed the following U.S. Pat. Nos.:

| | |
|---|---|
| 1,618,713 | 3,384,919 |
| 2,060,616 | 3,606,681 |
| 2,284,648 | 4,077,122 |
| 3,353,265 | 4,340,804 |
| | 4,617,033 |

The search did not disclose the invention claimed herein. There are several patents issued for attachment of vacuum systems to haircutting implements and shears. The use of a vacuum connected with welding is shown.

BACKGROUND OF THE INVENTION

This invention relates to the branding of animals and especially cattle with identification marks.

Owners of large herds of domesticated animals such as cattle have long marked their cattle with identification marks so that they could legally identify them. In the case of cattle rustling, the rightful owner could use the identification mark to assist in his recovering his rightful cattle. The most common way of applying the identification mark is by using a branding iron which in effect burns the identification mark or brand as it is commonly called onto the cow's or animal's hide. A very common way of making the brand was to have the brand or mark formed by an iron rod which has been bent to the desired design. The brand has a long handle on it. In the prior time before electricity was commonly available essentially all branding irons were heated by placing them in the coals of a wood fire which is built frequently out on the range where the cattle were. The cattle would then be tied in a secure position and the hot branding iron applied to produce the brand. More recently, the branding iron has been heated by electricity. In effect, the brand becomes the heating coil of a heater.

The branding of cattle or other animals results in a lot of fowl odors and pollutants into the air caused by the burning of the hair and hide. The brander, that is the person applying the brand, was subject to these pollutants. The breathing of these smoke and pollutants is both unpleasant and harmful to the respiratory system of the brander. The particular health problems for the brander are eye irritation, nasal conjestion and throat and lungs being filled with the smoke.

The problem just outlined is the problem which the person making the brand has endured ever since he started branding and even in this modern era. Although this health problem is as old as branding, no one has really done anything about it.

It is therefore an object of this invention to provide a system to protect the brander from the generated smoke.

SUMMARY OF THE INVENTION

This is an apparatus for preventing the above identified health hazards to the brander, tht is the person branding the cattle. We shall generally refer to cattle in this application, although the invention can be used with other animals, although probably not nearly so frequently as the branding of cattle. We take a conventional cattle branding iron and modify it so that we can "suck" all smoke away from the immediate area of the branding so that the brander does not have to inhale or is otherwise contaminated by such smoke and pollutants. A metal tube is attached to the cattle branding iron and has one end opening just adjacent the brand or iron itself that is used to transfer the brand or identification to the cattle. A flexible reinforced hose is attached to the other end of the metal tube. The metal tube is of sufficient length so that the reinforced hose is attached to the metal tube at a distance remote from the heating element of the branding iron so that the reinforced hose does not get too hot. The other end of the reinforced hose is attached to the input of a "suction" motor. A case is provided for the motor for its protection and also for carrying. The carrying case has a handle thereon.

In a preferred operation the cattle branding iron is electrically heated, thus the branding iron is provided with an electrical source and the suction motor is also provided with an electrical source. In operation, the branding iron is activated so that the brand or iron portion with the identification configuration is heated. Just before it is applied to the cow's hide, a switch which is adjacent the handle of the branding iron, is turned so that the suction motor is energized and will draw the smoke and other pollutants away from the brander.

DESCRIPTION OF THE DRAWINGS

FIG. 1 is a schematic view showing the branding iron, the suction motor, the vacuum hose and the electrical circuits.

FIG. 2 illustrates in more detail the attaching of the metal tube to the branding iron with a brand at one end.

FIG. 3 is a bottom view of the branding iron shown in FIG. 2.

FIG. 4 is a view taken along the line 4—4 of FIG. 2.

DETAILED DESCRIPTION

Attention is first directed to FIG. 1 which shows the overall layout. Shown thereon is a branding iron 10 having a brand 12 and a handle 14 and a body 16. The brand 12 is the part of the branding iron which has the identification mark and as shown in FIG. 4 is a backwards JI so that it will correctly appear on the hide of the animal. A suitable branding iron 10 is a LH Electrical Brander made by L and H Manufacturing Company, Mandon, N. Dak., Model 54. A vacuum or suction motor 18 is provided inside a carrying case 20 which is provided with a handle 22. The carrying case is for protection of the motor in addition to ease of carrying the motor. The electric motor 18 has a vacuum inlet 24. A metal tube 26 with a flexible reinforced hose 28 connected thereto is held to the body 16 of the branding iron 10 by a bracket 30. The metal tube 26 has an open end or mouth 32 which is adjacent the brand 12. The metal tube 26 and flexible hose 28 are or sufficient size to carry away the smoke and other pollutants. A typical size hose is about 1¼ inch in diameter. Mouth 32 is close enough to the brand 12 to pick up most of the smoke and in one "brand vac" that has been built is about two inches from the iron configuration itself which makes up the brand. Hose 28 is of sufficient length so that the vac motor 18 is out of the way of the activity during the actual branding and is far enough away so that its discharge 34 will be a sufficient distance from the brander so that the pollutants and smoke will not be inhaled by him or otherwise irritate his eyes and so forth. In one apparatus which we have built the hose 28 is about 15 to 16 feet long.

The branding iron 10 is provided with an electrical conduit 38 which has two internal conduits having ends 40 and 42 which may be conventional electrical prongs for connecting into an electrical power source in a conventional manner. The vacuum motor 18 is also connected to a power source and is provided with a switch 50. This includes a first internal conduit 44 and a second internal conduit 46. Conduit 46 connects to one side of a power source (not shown) at terminal 48. A switch 50 is provided on the branding iron 10. One terminal of the switch is connected through conduit 44 to the vac motor 18. The other terminal of switch 50 is connected through electrical conduit 52 to terminal 54. Terminal 54 and 48 can be typically prongs of the conventional type plug which is connected to an electrical source having 110 volts, 60 cycle electrical power.

The location of the switches and the connecting electrical conduits are shown a little clearer in the larger view of FIG. 2. Shown thereon are conduits 52 and 44 which connect to switch 50. A ground electrical conduit 60 is connected to bracket 30, which is metal, at connecting bolt or means 62. Conduits 44, 52 and 60 ar provided in a flexible housing 56 which is held to the vacuum hose 28 by clamps such as clamp 58.

In operation, just as we are ready to use the apparatus to brand a cow which has been secured in a relatively fixed position such as by ropes or proper cattle branding chutes, we plug in branding iron 10 by connecting conduit 38 to a suitable electrical power source. This causes the brand 12 to become hot very quickly to the branding temperature. Before applying the brand iron 12 we connect the plug for the vacuum motor indicated by prongs 48 and 54 into a convenient electrical power source. Just before the iron 12 is applied to the cow's hide we turn on switch 50 so that air will be sucked through inlet 50 of flexible hose 28 and out the outlet 34 of the vacuum motor 18. The brand is then applied and most of the smoke and other pollutants will be rapidly pumped through metal tube 26, reinforced hose 28, through vac motor 18 and out discharge 34. The discharge 34 is an appropriate distance from the brander so that the smoke and other pollutants will not be inhaled by the brander or irritate the brander's eyes. When the branding iron operation has been completed, the iron is, of course, moved from contact with the animal and then the switch 50 can be turned off so that a motor 18 will not have to run except when it is needed.

While the invention has been described with a certain degree of particularity, it is manifest that many changes may be made in the details of construction and the arrangement of components without departing from the spirit and scope of this disclosure. It is understood that the invention is not limited to the embodiments set forth herein for purposes of exemplification, but it to be limited only by the scope of the attached claim or claims, including the full range of equivalency to which each element thereof is entitled.

What is claimed is:

1. An apparatus for applying an identification brand to the hide of an animal which comprises:
   an iron having a specific identification character;
   a handle supporting said iron;
   a vacuum pump having an inlet;
   a vacuum hose having first and second ends, said first end connected to said vacuum pump and the second end opening in the vicinity of said iron for removing pollutants from the air in the vicinity of the iron.

2. An apparatus as defined in claim 1 including:
   a power source;
   means for connecting said ower source to said iron to cause it to become hot and
   second means to connect the power source to the vacuum pump.

3. A brand vac for removing smoke caused by the hot branding iron on animal's hair which comprise:
   a branding iron for applying a brand to the hide of an animal;
   a suction motor having an inlet;
   a metal tube attached to said branding iron;
   a flexible reinforced hose connected to said metal tube at one end and at the other end to the inlet of said suction motor.

4. A branding vac as defined in claim 3 in which said motor is an electrical motor and in which there is included:
   an electrical conduit connected to said branding iron for connecting into a power source;
   a switch means supporting by said branding iron;
   a second electrical conduit connecting said switch to said electrical motor;
   a third electrical conduit connected to said branding iron for heating the same.

5. A method of branding animals with a hot iron which comprise:
   heating said iron to a branding temperature;
   supporting a metal tube from said heating iron with an open end adjacent the heating element;
   connecting said metal tube through a flexible hose to a vacuum motor;
   applying said iron to the hide of an animal;
   energizing said vacuum motor during at least the time the hot iron is in contact with the animal.

* * * * *